United States Patent
Neiger et al.

(10) Patent No.: US 7,818,808 B1
(45) Date of Patent: Oct. 19, 2010

(54) PROCESSOR MODE FOR LIMITING THE OPERATION OF GUEST SOFTWARE RUNNING ON A VIRTUAL MACHINE SUPPORTED BY A VIRTUAL MACHINE MONITOR

(75) Inventors: Gilbert Neiger, Portland, OR (US); Stephen Chou, North Plainfield, NJ (US); Erik Cota-Robles, Portland, OR (US); Stalinselvaraj Jeyasingh, Portland, OR (US); Alain Kagi, Portland, OR (US); Michael Kozuch, Beaverton, OR (US); Richard Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1405 days.

(21) Appl. No.: 09/752,134

(22) Filed: Dec. 27, 2000

(51) Int. Cl.
*G06F 9/455* (2006.01)
*G06F 21/00* (2006.01)
(52) U.S. Cl. .................... 726/26; 718/1; 711/6; 703/27
(58) Field of Classification Search .............. 713/200; 726/26; 718/1; 711/6; 703/27
See application file for complete search history.

(56) References Cited

U.S. PATENT DOCUMENTS 3,699,532 A  10/1972  Schaffer et al.

(Continued)

FOREIGN PATENT DOCUMENTS

DE  42177444 A1  12/1992

(Continued)

OTHER PUBLICATIONS

Rozycki, Maciej W. Protected Mode Virtual Interrupts (PVI) on Pentium and SL-enhanced i486 Intel processors. 1996. Retrieved from the Internet: <URL:http://www.rcollins.org/articles/pvi1/pvi1.html>.*

(Continued)

*Primary Examiner*—Michael Pyzocha
(74) *Attorney, Agent, or Firm*—Thomas R. Lane

(57) ABSTRACT

In one embodiment, a processor mode is provided for guest software. The processor mode enables the guest software to operate at a privilege level intended by the guest software. When the guest software attempts to perform an operation restricted by the processor mode, the processor mode is exited to transfer control over the operation to a virtual-machine monitor, which runs outside this processor mode.

11 Claims, 9 Drawing Sheets

U.S. PATENT DOCUMENTS

| | | | |
|---|---|---|---|
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |
| 4,430,709 A | 2/1984 | Schleupen et al. | |
| 4,521,852 A | 6/1985 | Guttag | |
| 4,571,672 A | 2/1986 | Hatada et al. | |
| 4,621,318 A | 11/1986 | Maeda | |
| 4,759,064 A | 7/1988 | Chaum | |
| 4,787,031 A * | 11/1988 | Karger et al. | 718/100 |
| 4,795,893 A | 1/1989 | Ugon | |
| 4,802,084 A | 1/1989 | Ikegaya et al. | |
| 4,825,052 A | 4/1989 | Chemin et al. | |
| 4,907,270 A | 3/1990 | Hazard | |
| 4,907,272 A | 3/1990 | Hazard | |
| 4,910,774 A | 3/1990 | Barakat | |
| 4,975,836 A | 12/1990 | Hirosawa et al. | |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | |
| 5,187,802 A | 2/1993 | Inoue et al. | |
| 5,230,069 A | 7/1993 | Brelsford et al. | |
| 5,237,616 A | 8/1993 | Abraham et al. | |
| 5,237,669 A * | 8/1993 | Spear et al. | 711/2 |
| 5,255,379 A | 10/1993 | Melo | |
| 5,287,363 A | 2/1994 | Wolf et al. | |
| 5,293,424 A | 3/1994 | Holtey et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A * | 1/1995 | Garney | 714/10 |
| 5,421,006 A | 5/1995 | Jablon et al. | |
| 5,434,999 A | 7/1995 | Goire et al. | |
| 5,437,033 A | 7/1995 | Inoue et al. | |
| 5,442,645 A | 8/1995 | Ugon et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | |
| 5,506,975 A | 4/1996 | Onodera | |
| 5,511,217 A * | 4/1996 | Nakajima et al. | 718/100 |
| 5,522,075 A * | 5/1996 | Robinson et al. | 718/100 |
| 5,528,231 A | 6/1996 | Patarin | |
| 5,533,126 A | 7/1996 | Hazard | |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubala | |
| 5,566,323 A | 10/1996 | Ugon | |
| 5,568,552 A | 10/1996 | Davis | |
| 5,574,936 A | 11/1996 | Ryba et al. | |
| 5,582,717 A | 12/1996 | Di Santo | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,633,929 A | 5/1997 | Kaliski, Jr. | |
| 5,657,445 A | 8/1997 | Pearce | |
| 5,668,971 A | 9/1997 | Neufeld | |
| 5,684,948 A | 11/1997 | Johnson et al. | |
| 5,706,469 A | 1/1998 | Kobayashi | |
| 5,717,903 A | 2/1998 | Bonola | |
| 5,720,609 A | 2/1998 | Pfefferle | |
| 5,721,222 A | 2/1998 | Bernstein et al. | |
| 5,729,760 A | 3/1998 | Poisner | |
| 5,737,604 A | 4/1998 | Miller et al. | |
| 5,737,760 A | 4/1998 | Grimmer, Jr. et al. | |
| 5,740,178 A | 4/1998 | Jacks et al. | |
| 5,752,046 A | 5/1998 | Oprescu et al. | |
| 5,757,604 A | 5/1998 | Bennett et al. | |
| 5,757,919 A | 5/1998 | Herbert et al. | |
| 5,764,969 A | 6/1998 | Kahle et al. | |
| 5,796,835 A | 8/1998 | Saada | |
| 5,796,845 A | 8/1998 | Serikawa et al. | |
| 5,805,712 A | 9/1998 | Davis | |
| 5,809,546 A | 9/1998 | Greenstein et al. | |
| 5,825,875 A | 10/1998 | Ugon | |
| 5,825,880 A | 10/1998 | Sudia et al. | |
| 5,835,594 A | 11/1998 | Albrecht et al. | |
| 5,844,986 A | 12/1998 | Davis | |
| 5,852,717 A | 12/1998 | Bhide et al. | |
| 5,854,913 A | 12/1998 | Goetz et al. | |
| 5,867,577 A | 2/1999 | Patarin | |
| 5,872,994 A | 2/1999 | Akiyama et al. | |
| 5,890,189 A | 3/1999 | Nozue et al. | |
| 5,900,606 A | 5/1999 | Rigal | |
| 5,901,225 A | 5/1999 | Ireton et al. | |
| 5,901,312 A * | 5/1999 | Radko | 718/104 |
| 5,903,752 A | 5/1999 | Dingwall et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,944,821 A | 8/1999 | Angelo | |
| 5,953,502 A | 9/1999 | Helbig, Sr. | |
| 5,956,408 A | 9/1999 | Arnold | |
| 5,970,147 A | 10/1999 | Davis et al. | |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo | |
| 6,075,938 A | 6/2000 | Bugnion et al. | |
| 6,085,296 A | 7/2000 | Karkhanis | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Isley | |
| 6,148,379 A | 11/2000 | Schimmel | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone et al. | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 | 4/2001 | Reardon | |
| 6,222,923 B1 | 4/2001 | Schwenk | |

| | | |
|---|---|---|
| 6,249,872 B1 | 6/2001 | Wildgrube et al. |
| 6,252,650 B1 | 6/2001 | Nakamura |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter et al. |
| 6,308,270 B1 | 10/2001 | Guthery et al. |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 * | 5/2002 | Devine et al. .................. 718/1 |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,496,847 B1 * | 12/2002 | Bugnion et al. ................ 718/1 |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,132 B1 * | 11/2003 | Traut ............................ 711/6 |
| 6,651,171 B1 | 11/2003 | England et al. |
| 6,678,825 B1 | 1/2004 | Ellison et al. |
| 6,684,326 B1 | 1/2004 | Cromer et al. |
| 6,795,966 B1 * | 9/2004 | Lim et al. ...................... 718/1 |
| 6,996,828 B1 * | 2/2006 | Kimura et al. .............. 719/319 |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |
| 2002/0023032 A1 | 2/2002 | Pearson et al. |
| 2002/0069335 A1 * | 6/2002 | Flylnn, Jr. .................. 711/153 |
| 2002/0147916 A1 | 10/2002 | Strongin et al. |
| 2002/0166061 A1 | 11/2002 | Falik et al. |
| 2002/0169717 A1 | 11/2002 | Challener |
| 2003/0018892 A1 | 1/2003 | Tello |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |
| 2003/0196085 A1 | 10/2003 | Lampson et al. |
| 2004/0117539 A1 | 6/2004 | Bennett et al. |

FOREIGN PATENT DOCUMENTS

| | | |
|---|---|---|
| EP | 0473913 | 3/1992 |
| EP | 0600112 A1 | 6/1994 |
| EP | 0602867 | 6/1994 |
| EP | 0892521 | 1/1999 |
| EP | 0930567 A3 | 7/1999 |
| EP | 0961193 | 12/1999 |
| EP | 0965902 | 12/1999 |
| EP | 1030237 A1 | 8/2000 |
| EP | 1055989 | 11/2000 |
| EP | 1056014 | 11/2000 |
| EP | 1085396 | 3/2001 |
| EP | 1146715 A1 | 10/2001 |
| EP | 1209563 | 5/2002 |
| EP | 1271277 | 1/2003 |
| JP | 76139 A0 | 3/2000 |
| WO | WO9524696 | 9/1995 |
| WO | WO 97/29567 A1 | 8/1997 |
| WO | WO9812620 | 3/1998 |
| WO | WO 98/34365 | 8/1998 |
| WO | WO 98/44402 | 10/1998 |
| WO | WO 99/05600 | 2/1999 |
| WO | WO 99/09482 | 2/1999 |
| WO | WO9918511 | 4/1999 |
| WO | WO 99/57863 | 11/1999 |
| WO | WO9965579 | 12/1999 |
| WO | WO0021238 | 4/2000 |
| WO | WO 00/62232 | 10/2000 |
| WO | WO 01/27723 A2 | 4/2001 |
| WO | WO 01/27821 A2 | 4/2001 |
| WO | WO0163994 | 8/2001 |
| WO | WO 01/75564 | 10/2001 |
| WO | WO 01/75565 A2 | 10/2001 |
| WO | WO 01/75595 A2 | 10/2001 |
| WO | WO0201794 | 1/2002 |
| WO | WO 02/17555 | 2/2002 |
| WO | WO02060121 | 8/2002 |
| WO | WO 02/086684 | 10/2002 |
| WO | WO02086684 | 10/2002 |
| WO | WO03058412 | 7/2003 |

OTHER PUBLICATIONS

Walker, Wade and Cragon, Harvey. Interrupt Processing in Concurrent Processors. Jun. 1995. Computer. pp. 36-46.*

Collins, Robert R. Details of Intel's Virtual Mode Extensions (VME). Retrieved from the Internet: <URL:http://www.rcollins.org/ddj/Mar98/Mar98.html>.*

Berg, Cliff, "How Do I Create a Signed Applet?" Dr. Dobb's Journal, Aug. 1997, pp. 1-9.

Goldberg, Robert P., "Survey of Virtual Machine Research," IEEE Computer Magazine vol. 7, No. 6, pp. 34-45, 1974.

Gong, Li, et al., "Going Beyond the Sandbox: An Overview of the New Security Architecture in the Java Development Kit 1.2," JavaSoft, Sun Microsystems, Inc., Proceedings of the USENIX Symposium on Internet Technologies and Systems, Monterey, California, 11 pages Dec. 1997.

Gum, P.H., "System/370 Extended Architecture: Facilities for Virtual Machines," IBM J. Research Development, vol. 27, No. 6, pp. 530-544, Nov. 1983.

Heinrich, J., "MIPS R4000 Microprocessor User's Manual," Second Edition, Chapter 4: Memory Management, pp. 67-79.

Intel Corporation, Intel386™ DX Microprocessor, 32-Bit CHMOS Microprocessor With Integrated Memory Management, 56 pages, Dec. 1995.

Lawton, K., "Running Multiple Operation Systems Concurrently on an IA32 PC Using Virtualization Techniques," http://www.plex86.org/research/paper.txt., pp. 1-31, downloaded Aug. 9, 2001.

Motorola, M68040 User's Manual (Including the MC68040, MC68040V, MC68LC040, MC68EC040, and MC68EC040V), Revised 1993.

Rosenblum, M., "VMware's Virtual Platform™ A Virtual Machine Monitor for Commodity PCs," Proceedings of the 11th Hotchips Conference, Stanford University Palo Alto, California, pp. 185-196, Aug. 1999.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

Heinrich, J., "MIPS R4000 Microprocessor User's Manual," Chapter 4, Memory Management, pp. 61-97, 1993.

IBM Technical Disclosure Bulletin, "Information Display Technique For A Terminate Stay Resident Program," vol. 34, Issue No. 7A, pp. 156-158, Dec. 1, 1991.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Kashiwagi, Kazuhiko, et al., "Design and Implementation of Dynamically Reconstructing System Software," Software Engineering Conference, 1996 Asia Pacific Seoul, South Korea, IEEE Comput. Soc. Dec. 4, 1996, pp. 278-287.

PCT Search Report dated Jul. 29, 2003 (U.S. Patent No. '075 Previously cited).

PCT Search Report dated Jul. 22, 2003.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17, XP002247347, Denver, CO.

Trusted Computing Platform Alliance (TCPA), Main Specification Version 1.1a, 321 pages, Copyright 2000-2001.

Brands, Stefan , "Restrictive Blinding of Secret-Key Certificates", *Springer-Verlag XP002201306*, (1995),Chapter 3.

Chien, Andrew A., et al., "Safe and Protected Execution for the Morph/AMRM Reconfigurable Processor", *7th Annual IEEE Symposium, FCCM '99 Proceedings, XP010359180, ISBN 0-7695-0375-6*, Los Alamitos, CA, (Apr. 21, 1999),209-221.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

IBM, "Information Display Technique for a Terminate Stay Resident Program IBM Technical Disclosure Bulletin", *TDB-ACC-No. NA9112156*, vol. 34. Issue 7A, (Dec. 1, 1991),156-158.

INTEL, "IA-32 Intel Architecture Software Developer's Manual", vol. 3: *System Programming Guide*, Intel Corporation—2003,13-1 through 13-24.

Karger, Paul A., et al., "A VMM Security Kernel for the VAX Architecture", *Proceedings of the Symposium on Research in Security and Privacy, XP010020182, ISBN 0-8186-2060-9*, Boxborough. MA, (May 7, 1990),2-19.

Kashiwagi, Kazuhiko , et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn , et al., "Replacement Strategy for Aging Avionics Computers", *IEEE AES Systems Magazine*, XP002190614,(Mar. 1999).

Menezes, Oorschot , "Handbook of Applied Cryptography", *CRC Press LLC, USA XP002201307*, (1997),475.

Richt, Stefan , et al., "In-Circuit-Emulator Wird Echtzeittauglich", *Elektronic, Franzis Verlag GMBH*, Munchen, DE, vol. 40, No. 16, XP000259620,(100-103),Aug. 6, 1991.

Robin, John S., et al., "Analysis of the Pentium's Ability to Support a Secure Virtual Machine Monitor", *Proceedings of the 9th USENIX Security Symposium, XP002247347*, Denver, Colorado (Aug. 14, 2000),1-17.

Saez, Sergio , et al., "A Hardware Scheduler for Complex Real-Time Systems", *Proceedings of the IEEE International Symposium on Industrial Electronics*, XP002190615,(Jul. 1999),43-48.

Sherwood, Timothy , et al., "Patchable Instruction ROM Architecture", *Department of Computer Science and Engineering*, University of California, San Diego, La Jolla, CA (Nov. 2001).

Coulouris, George, et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors (ICCD '86)*, (Oct. 6, 1986),155-160.

Fabry, R.S., "Capability-Based Addressing", *Fabry. R.S., "Capability-Based.Addressing," Communications of the ACM*, vol. 17. No. 7, (Jul. 1974),403-412.

Frieder, Gideon, "The Architecture and Operational Characteristics of the VMX Host Machine", *The Architecture And Operational Characteristics of the VMX Host Machine, IEEE*, (1982),9-16.

HP Mobile Security Overview, "HP Mobile Security Overview", (Sep. 2002),1-10.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul. 2, 2002),1-6.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: *IA-64 System Architecture*, Order No. 245318-001, (Jan. 2000),i, ii, 5.1-5.3, 11.1-11.8, 11.23-11.26.

Menezes, Alfred J., et al., "Handbook of Applied Cryptography", *CRC Press Series on Discrete Mathematices and its Applications*, Boca Raton, FL, XP002165287, ISBN 0849385237,(Oct. 1996),403-405, 506-515, 570.

Nanba, S., et al., "VM/4: ACOS-4 Virtual Machine Architecture", *VM/4: ACOS-4 Virtual Machine Architecture, IEEE*, (1985),171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce, "Applied Cryptography: Protocols, Algorithm, and Source Code in C", *Wiley John & Sons. Inc.*, XP002939871; ISBN 0471117099,(Oct. 1995),47-52.

Schneier, Bruce, "Applied Cryptography: Protocols, Algorithm, and Source Code in C", *Wiley, John & Sons, Inc.*, XP002138607; ISBN 0471117099,(Oct. 1995),56-65.

Schneier, Bruce, "Applied Cryptography: Protocols, Algorithms, and Source Code C", *Wiley John & Sons, Inc.*, XP0021111449; ISBN 0471117099,(Oct. 1995),169-187.

Schneier, Bruce, "Applied Cryptography: Protocols, Algorithms, and Source Code in C", *2nd Edition: Wiley John & Sons, Inc.*, XP002251738; ISBN 0471128457,(Nov. 1995),28-33; 176-177; 216-217; 461-473; 518-522.

* cited by examiner

PROCESSOR MODE FOR LIMITING THE OPERATION OF GUEST SOFTWARE RUNNING ON A VIRTUAL MACHINE SUPPORTED BY A VIRTUAL MACHINE MONITOR

FIELD OF THE INVENTION

The present invention relates generally to virtual machines, and more specifically to providing processor support for a virtual-machine monitor.

BACKGROUND OF THE INVENTION

A conventional virtual-machine monitor (VMM) typically runs on a computer and presents to other software the abstraction of one or more virtual machines. Each virtual machine may function as a self-contained platform, running its own "guest operating system" (i.e., an operating system hosted by the VMM). The guest operating system expects to operate as if it were running on a dedicated computer rather than a virtual machine. That is, the guest operating system expects to control various computer operations and have access to hardware resources during these operations. The hardware resources may include processor-resident resources (e.g., control registers) and resources that reside in memory (e.g., descriptor tables). However, in a virtual-machine environment, the VMM should be able to have ultimate control over these resources to provide proper operation of virtual machines and protection from and between virtual machines. To achieve this, the VMM typically intercepts and arbitrates all accesses made by the guest operating system to the hardware resources.

Current implementations of VMMs may be based on software techniques for controlling access to hardware resources by the guest operating system. However, these software techniques may lack the ability to prevent guest software from accessing some fields in the processor's control registers and memory. For instance, the guest operating system may not be prevented from accessing a requestor privilege level (RPL) field in the code segment register of IA-32 microprocessors. In addition, existing software techniques typically suffer from performance problems. Thus, an alternative mechanism is needed for supporting the operation of the VMM.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

Figure 1:
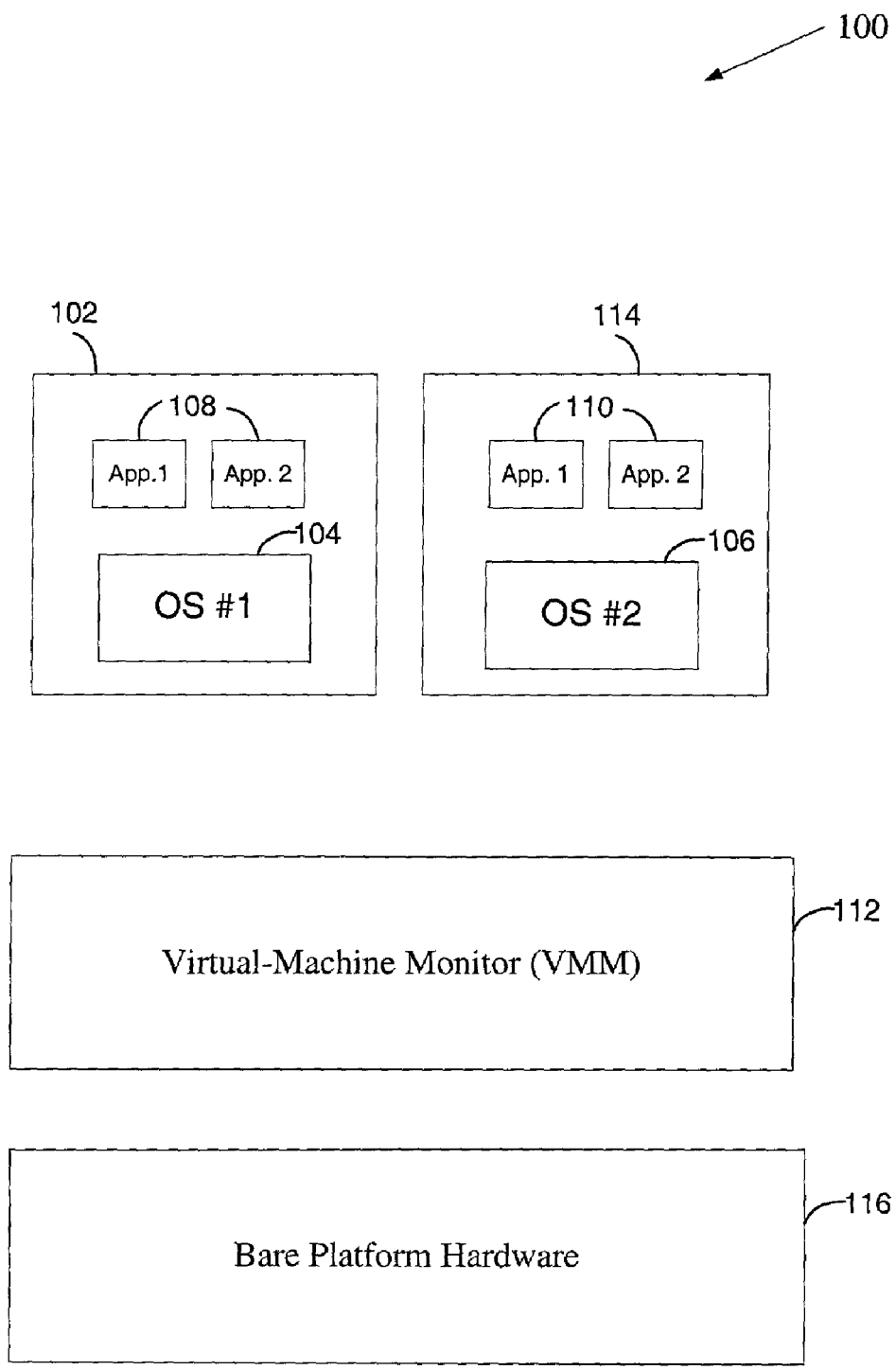
FIG. 1 illustrates one embodiment of a virtual-machine environment.

A method and apparatus for providing processor support to a virtual-machine monitor are described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Instructions are executable using one or more processing devices (e.g., processors, central processing units, etc.).

The algorithms and displays presented herein are not inherently related to any particular computer or other apparatus. Various general-purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide processor support for a virtual-machine monitor (VMM). FIG. 1 illustrates one embodiment of a virtual-machine environment 100, in which the present invention may operate. In this embodiment, bare platform hardware 116 comprises a computing platform, which may be capable, for example, of executing a standard operating system (OS) or a virtual-machine monitor (VMM), such as a VMM 112. A VMM, though typically implemented in software, may export a bare machine interface, such as an emulation, to higher level software. Such higher level software may comprise a standard or real-time OS, although the invention is not limited in scope in this respect and, alternatively, for example, a VMM may be run within, or on top of, another VMM. VMMs and their typical features and functionality are well-known by those skilled in the art and may be implemented, for example, in software, firmware or by a combination of various techniques.

As described above, a VMM presents to other software (i.e., "guest" software) the abstraction of one or more virtual machines (VMs). FIG. 1 shows two VMs, 102 and 114. The guest software of each VM includes a guest OS such as a guest OS 104 or 106 and various guest software applications 108-110. Each of the guest OSs 104 and 106 expects to control access to physical resources (e.g., processor registers, memory and memory-mapped I/O devices) within the hardware platform on which the guest OS 104 or 106 is running and to perform other functions. However, in a virtual-machine environment, the VMM 112 should be able to have ultimate control over the physical resources to provide proper operation of VMs 102 and 114 and protection from and between VMs 102 and 114. The VMM 112 achieves this goal by intercepting all accesses of the guest OSs 104 and 106 to the computer's physical resources. Various techniques may be used to enable the VMM 112 to intercept the above accesses. One of such techniques is a guest-depriviliging technique which forces all guest software to run at a hardware privilege level that does not allow that software access to certain hardware resources. As a result, whenever the guest OS 104 or 106 attempts to access any of these hardware resources, it "traps" to the VMM 112, i.e., the VMM 112 receives control over an operation initiated by the guest OS if this operation involves accessing such hardware resources.

Figure 2:
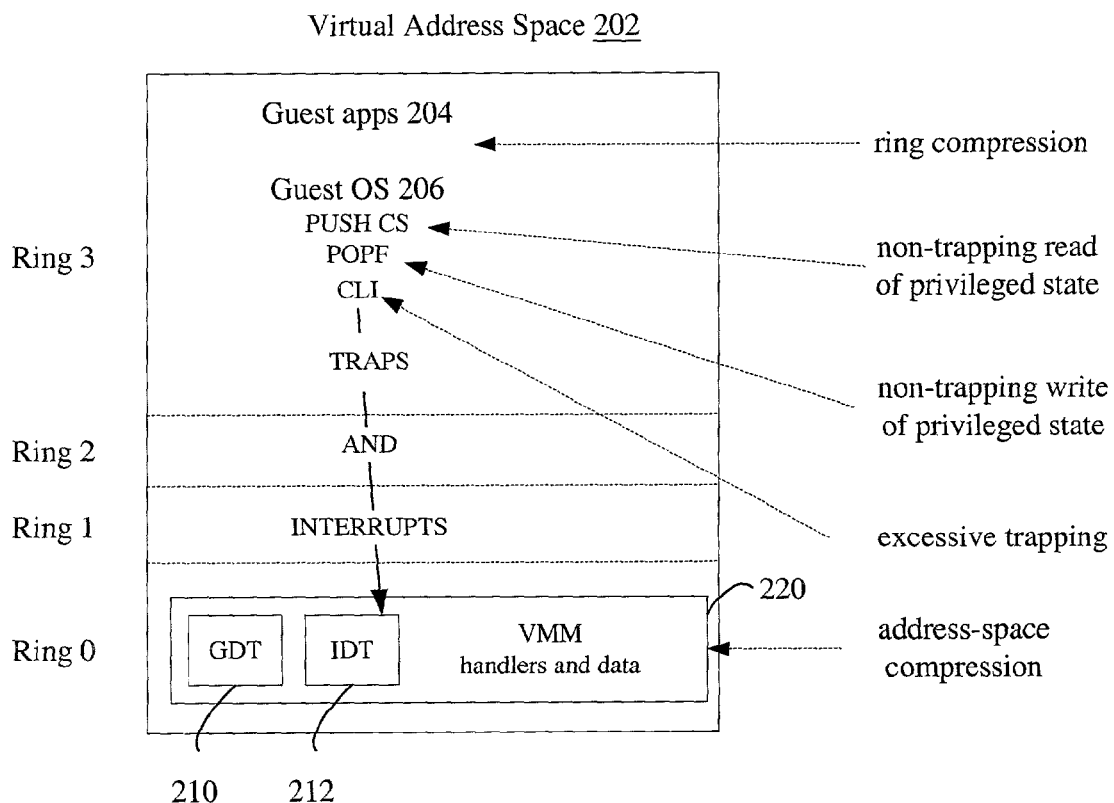
FIG. 2 illustrates operation of a virtual-machine monitor based on guest deprivileging.

FIG. 2 illustrates a prior art embodiment of the operation of a VMM that supports guest deprivileging. As described above, guest deprivileging forces a guest OS to execute in a less than privileged mode of execution. For IA-32 microprocessors, the nature of page-based protection is such that all guest software runs at the least privileged level (i.e., ring 3). That is, a guest OS 206 and guest applications 204 run at the same privilege level. As a result, the guest OS 206 may not be able to protect itself from the guest applications 204, thereby possibly compromising the integrity of the guest OS 206. This problem is known as ring compression.

Guest deprivileging may also cause an address-space compression problem. As described above, certain attempts of guest software to access hardware resources result in traps that transfer control to the VMM 220. In order to enable this transfer of control, a portion of VMM code and/or data structures may be architecturally required to reside in the same virtual-address space as the guest OS 206. For instance, the IA-32 instruction-set architecture (ISA) may require that an interrupt descriptor table (IDT) 212, a global descriptor table (GDT) 210 and trap handling routines reside at the same virtual space as the guest OS 206. The VMM code and data structures 220 that reside in the virtual space 202 must be protected from accesses by guest software (e.g., by running at ring 0). Accordingly, the guest OS 206 does not control the entire address space 202 as the guest OS 206 expects. This causes an address-space compression problem.

Another limitation of VMMs that use guest deprivileging pertains to some cases in which the processors fail to prevent guest software from reading privileged hardware resources. For instance, the IA-32 microprocessors allow the guest OS 206 to execute PUSH CS instructions which store a code segment register into memory. One of this register's fields stores information about the current privilege level. Accordingly, the guest OS 206 can become aware that its privilege level is 3, and not 0 as the guest OS 206 expects, by reading the value of the current privilege level from the memory. As a result, the guest OS 206 may be exposed to the fact that it is running on a virtual machine, and the integrity of the guest OS 206 may be compromised.

Similarly, in some cases, the processors do not trap an attempt of the guest software to modify privileged software resources. For instance, the IA-32 processors allow the guest OS 206 to issue POPF instructions which attempt to load EFLAGS, and instead of generating a trap, simply ignore all or part of such attempts of the guest OS 206 because the guest OS 206 executes these instructions with insufficient privilege. As a result, the guest OS 206 believes that a corresponding EFLAGS field has been modified but the VMM 220 is not aware of that and cannot properly emulate this modification. Accordingly, the guest OS 206 may be exposed to the fact that it is running on a virtual machine, and the integrity of the guest OS 206 may be compromised.

Yet another limitation of VM monitors that use guest deprivileging is caused by excessive trapping. Because the number of hardware resource elements that need to be protected from accesses by guest software is significant and such accesses may be frequent, traps may occur often. For instance, the IA-32 microprocessors support CLI instructions. The CLI instructions are issued to modify an interrupt flag, which is an element of the privileged hardware resources and which thus cannot be accessed by unprivileged software. The guest OS 206 commonly issues these instructions during its operation, thereby causing frequent traps to the VMM 220. Frequent trapping negatively affects system performance and reduces the utility of the VMM 220.

Figure 3:
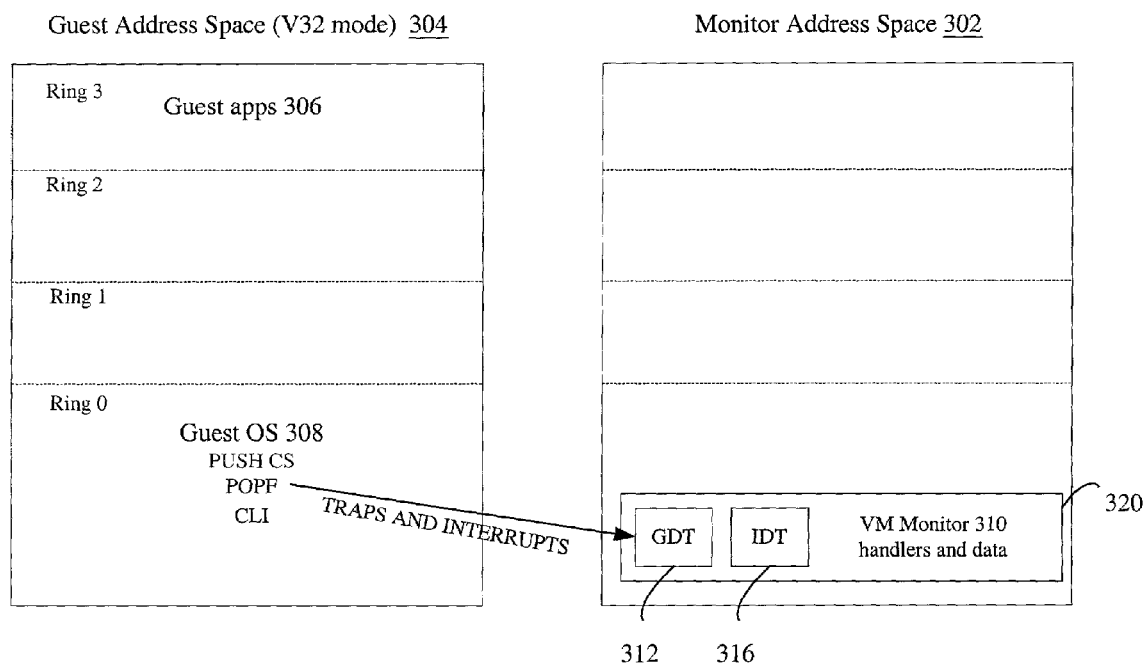
FIG. 3 is a block diagram of a system for providing processor support to a virtual-machine monitor, according to one embodiment of the present invention.

The present invention addresses the above problems and various other limitations by providing processor support for a VMM. FIG. 3 is block diagram of a system for providing processor support to a virtual-machine monitor, according to one embodiment of the present invention.

Referring to FIG. 3, all guest software runs at a processor mode referred to herein as a virtual 32-bit mode (V32 mode). V32 mode allows the guest software to run at its intended privilege level. For instance, for the IA-32 ISA, the guest OS 308 runs at the most privileged level (i.e., ring 0) and guest applications 306 run at the least privileged level (i.e., ring 3). V32 mode restricts the operation of the guest software by preventing the guest software from performing operations that may result in its access of certain privileged hardware resources. V32 mode is exited when the guest software attempts to perform such an operation.

The VMM 320 runs outside V32 mode. When a transition out of V32 mode occurs, the VMM 320 receives control over the operation initiated by the guest OS 308 or guest application 306. The VMM 320 then performs this operation, and transfers control back to the guest software by entering V32 mode, thereby emulating the functionality desired by the guest software.

In one embodiment, V32 mode is implemented by maintaining a flag in one of the processor's control registers (e.g., CR0) to indicate whether the processor is in V32 mode or not. In another embodiment, this flag (referred to herein as EFLAGS.V32) is maintained in one of the reserved bits in the upper half of EFLAGS. The EFLAGS.V32 flag is modified either by a transition out of V32 mode or a transition into V32 mode.

In one embodiment, the ability of the processor to support V32 mode are reported using one of the reserved feature bits that are returned in EDX when the CPUID instruction is executed with the value 1 in EAX. It should be noted that a variety of other mechanisms can be used to implement V32 mode and to report the ability of the processor to support V32 mode without loss of generality.

In one embodiment, certain exceptions and interrupts cause a transition out of V32 mode. These exceptions and interrupts include "virtualization traps." A virtualization trap is generated when guest software that runs in V32 mode attempts to perform an operation that may result in its access of certain privileged hardware resources. In one embodiment, when a transition out of V32 mode occurs, the guest address space 304 is automatically changed to the VMM address space 302. In addition, the processor state that was used by guest software is saved and stored in temporary registers, and the processor state required by the VMM 320 is loaded.

In one embodiment, when a transition into V32 mode occurs, the processor state that was saved on the transition out of V32 mode (i.e., to the VMM 320) is automatically restored, the VMM address space 302 is changed to the guest address space 304, and control is returned to the guest OS 308.

In one embodiment, when guest software runs in V32 mode, software interrupts (e.g., interrupts caused by execution of BOUND, INT or INTO instructions) are handled by the guest OS 308 using the guest IDT (i.e., the IDT residing in the guest address space 304). All other interrupts and exceptions including virtualization traps cause a transition out of V32 mode which results in a change of the guest address space 304 to the VMM address space 302. The IDT 316 is then used to point to code that handles a corresponding exception or interrupt.

In one embodiment, a new interrupt flag (i.e., a virtual-machine interrupt flag) is maintained for accesses by guest software. Whenever guest software attempts to access the interrupt flag (IF), it will instead access the virtual machine interrupt flag (VMIF). In one embodiment, an attempt of guest software to access VMIF (e.g., using the CLI instruction) does not cause a transition out of V32 mode, except when the guest OS 308 has just set VMIF to 1 (e.g., through the STI instruction) and the VMM 320 wishes to deliver a pending interrupt to the guest OS 308. Such pending interrupts referred to herein as "virtual pending interrupts" generate virtualization traps which allow the VMM 320 to deliver a pending interrupt to the guest software when the guest OS 308 signals that it is ready to process such an interrupt. In one embodiment, one of the reserved bits in the upper half of the EFLAGS register is used to maintain a flag indicating whether guest software has a pending virtual interrupt.

The implementation of V32 mode allows resolving all of the problems caused guest depriviling as described above. In particular, because guest software runs in V32 mode at its intended privilege level, the problem of ring compression is eliminated. In addition, address-space compression is no longer a problem because a virtualization trap automatically causes a switch to the VMM address space 302, and therefore neither the tables controlling such transfers nor the code handling a corresponding virtualization trap is required to reside in the guest address space 304.

Furthermore, because V32 mode enables the guest software to run at its intended privilege level, the hardware resources that need to be protected no longer include those elements of hardware resources that control the privilege level. For instance, the PUSH CS instruction described above can no longer reveal to the guest OS 308 that it runs on a virtual machine because the field of the code segment register that stores information about a current privilege level now stores the privilege level intended by the guest OS 308. Similarly, POPF instructions which attempt to load EFLAGS are no longer ignored when executed by the guest OS 308 because the guest OS 206 executes these instructions with sufficient privilege.

Accordingly, the number of elements of hardware resources that need to be protected is reduced. If any of them allow non-trapping read or write accesses by guest software, they are specifically architected to cause traps when executed in V32 mode. Thus, the problems caused by non-trapping read and write accesses are eliminated. In addition, because the implementation of V32 mode reduces the number of elements of hardware resources that need to be protected, the number of traps that occur when guest software attempts to access these elements is also reduced. Frequency of traps is further reduced by providing mechanisms for eliminating traps caused by the most frequently used instructions. For instance, STI instructions no longer cause traps except when guest software has a pending virtual interrupt.

Figure 4:
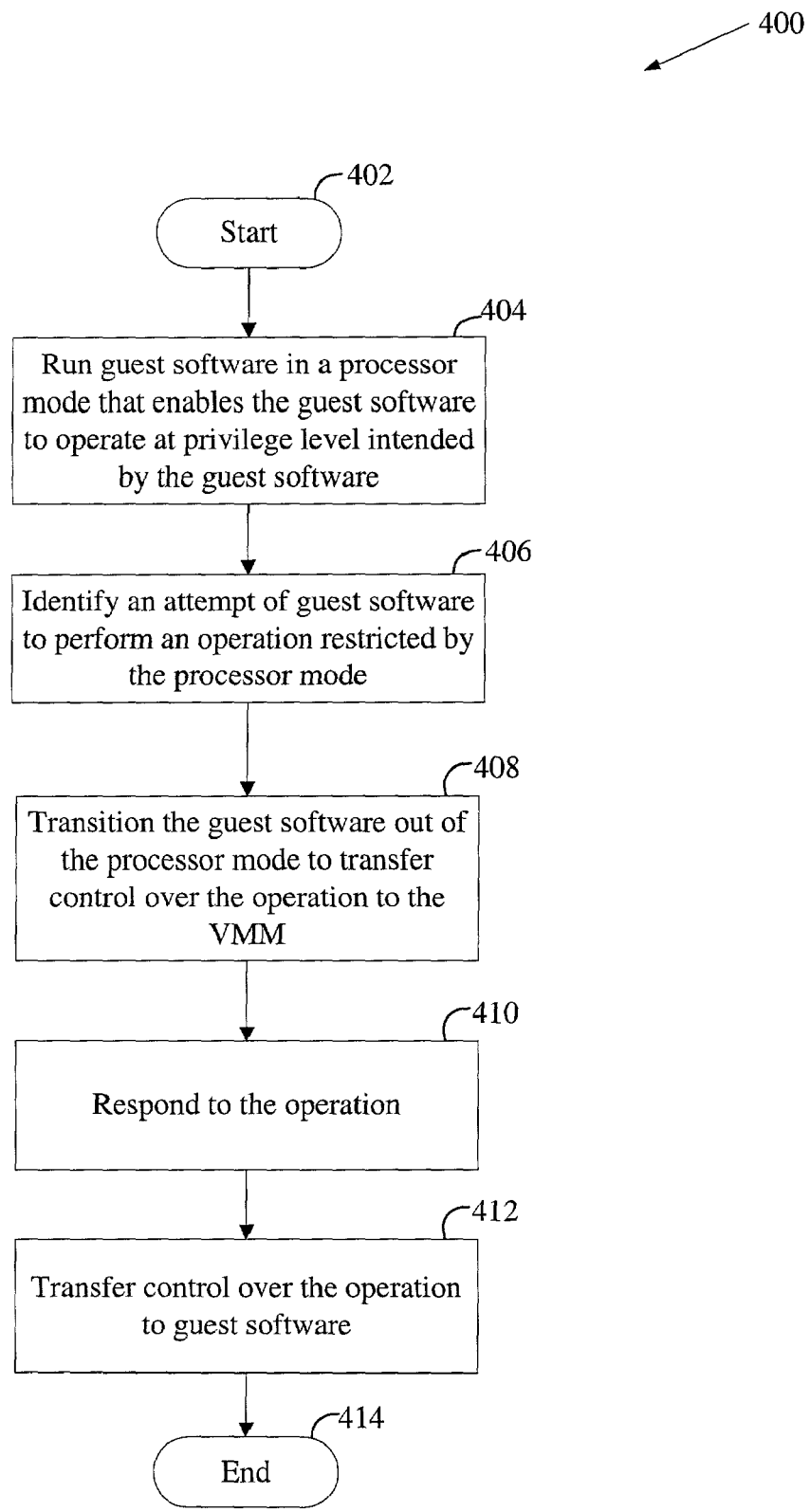
FIG. 4 is a flow diagram of a method for providing processor support to a virtual-machine monitor, according to one embodiment of the present invention.

FIG. 4 is a flow diagram of a method 400 for providing processor support to a virtual machine monitor, according to one embodiment of the present invention. At processing block 404, guest software is executed in a processor mode (i.e., V32 mode) that allows guest software to operate at a privilege level intended by the guest software. That is, a guest OS may operate at a supervisor privilege level, and guest applications may operate at a user privilege level.

At processing block 406, an attempt of the guest software to perform an operation restricted by V32 mode is identified. In response to this attempt, V32 mode is exited to transfer control over the operation initiated by the guest software to the VMM which runs outside V32 mode (processor block 408). In one embodiment, the VMM configures what operations should cause a transition out of V32 mode as will be described in greater detail below in conjunction with FIG. 7. In one embodiment, such operations generate virtualization traps that cause a transition out of V32 mode. Alternatively, any other mechanism known in the art can be used to cause a transition out of V32 mode. One embodiment of performing a transition out of V32 mode is described in greater detail below in conjunction with FIG. 5.

Further, the VMM responds to the operation intended by the guest software (processing block 410). Afterwards, V32 mode is re-entered to transfer control over this operation back to the guest software (processing block 412), and method 400 returns to processing block 404. In one embodiment, when a transition into V32 mode occurs, the processor state expected by the guest software is automatically restored and the VMM address space is changed to the guest address space.

Figure 5:
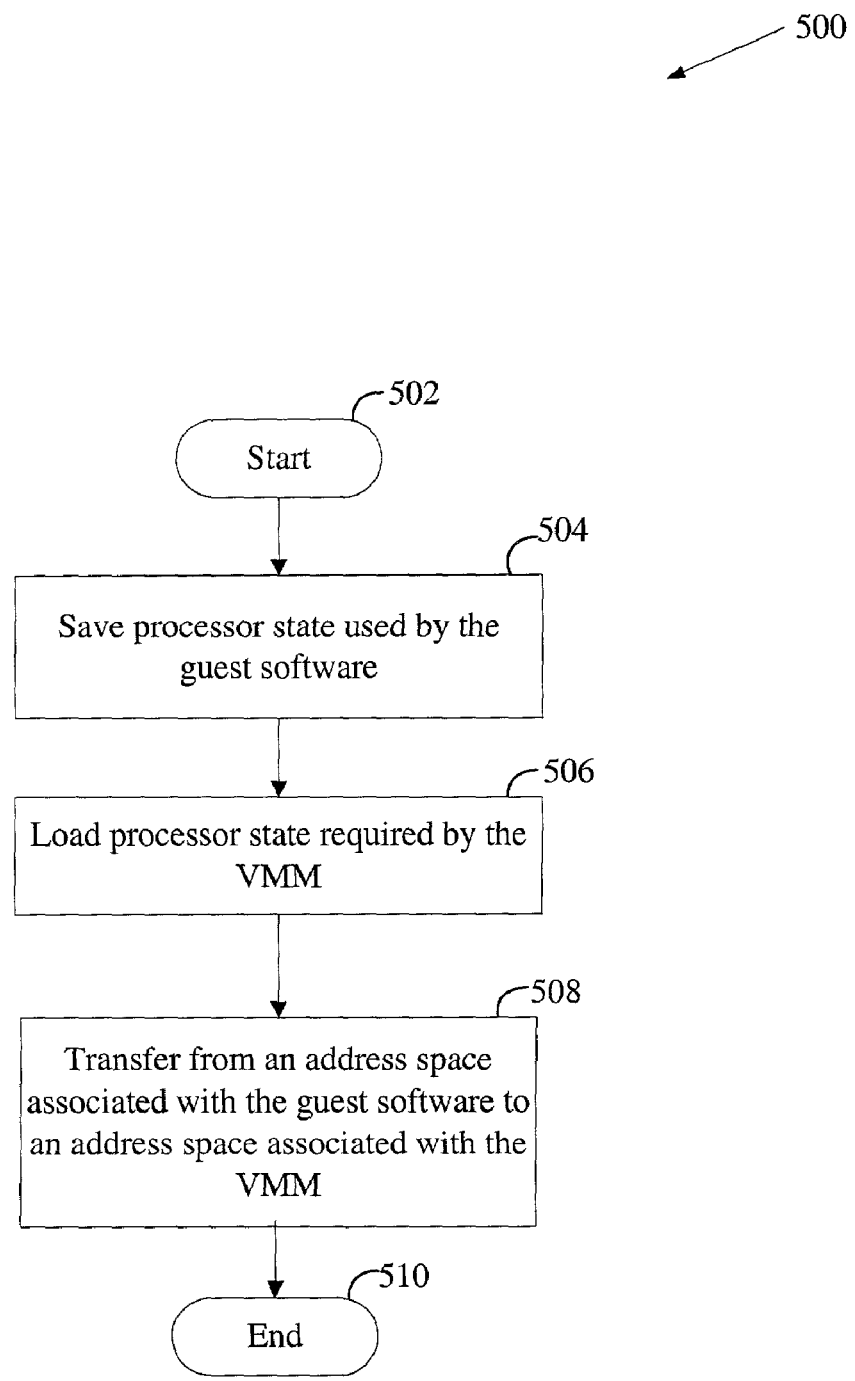
FIG. 5 is a flow diagram of a method for performing a transition out of V32 mode, according to one embodiment of the present invention.
Figure 6:
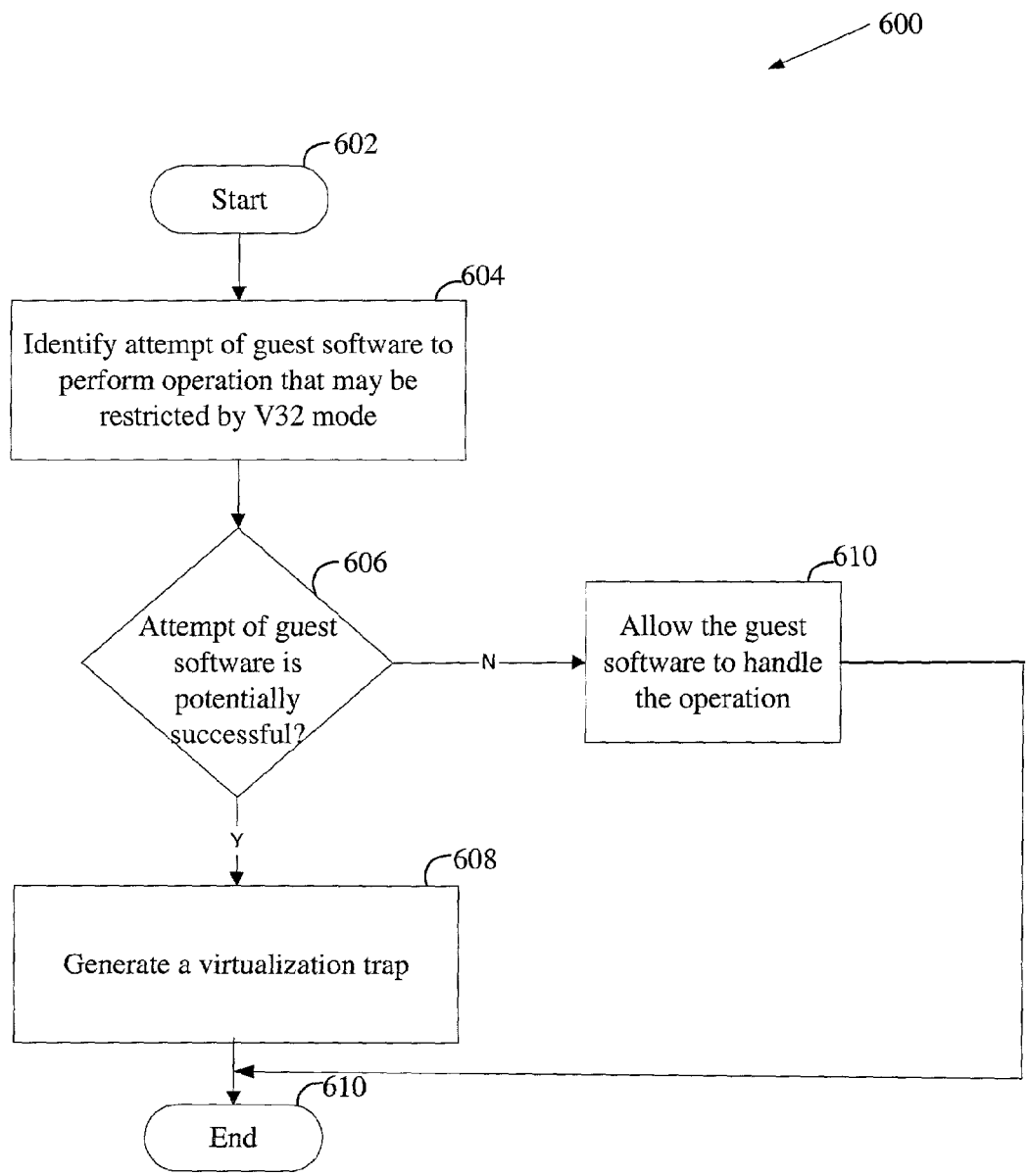
FIG. 6 is a flow diagram of a method for generating virtualization traps, according to one embodiment of the present invention.

FIG. 5 is a flow diagram of a method 500 for performing a transition out of V32 mode, according to one embodiment of the present invention. Method 500 begins with saving processor state used by guest software (processing block 504). In one embodiment, the saved processor stated is stored in the processor's temporary registers. At processing block 506, the processor state required by the VMM is loaded into processor registers. In one embodiment, loading the processor state affects a change of the guest address space to the VMM address space (e.g., the processor state is loaded by loading the control register CR3). In an alternative embodiment, loading the processor state does not cause a change in the address space. In such an embodiment, at processing block 508, an address space switch is performed to transfer from the guest address space to the VMM address space. Accordingly, when an interrupt or exception causing the transition occurs, the IDT residing in the VMM address space is automatically used to point to the VMM-resident code for handling this interrupt or exception. FIG. 6 is a flow diagram of a method 600 for generating virtualization traps, according to one embodiment of the present invention. Method 600 begins with identifying an attempt of guest software to perform an operation that may be restricted by V32 mode (processing block 604). At decision box 606, a determination is made as to whether the attempt of the guest software can potentially succeed. If the determination is positive, a virtualization trap is generated (processing block 608). Alternatively, no virtualization trap is generated, and the guest software proceeds with the operation (processing block 610). For instance, according to the IA-32 ISA, the RDMSR instruction can be executed only by software running with supervisor privilege. Consequently, if the guest software OS which runs with supervisor privilege executes this instruction, its attempt may be successful. If a guest application which runs with user privilege executes this instruction, its attempt will not be successful, and a general-protection fault will occur. Accordingly, an attempt of the guest OS to execute the RDMSR instruction will cause a virtualization trap but an attempt of a guest application will be handled by the guest OS.

In one embodiment, virtualization traps will be caused by potentially successful attempts of the guest OS to access the processor's control registers (e.g., CR0-CR4). For instance, for IA-32 processors, virtualization traps will be generated in response to an attempt of the guest software to execute MOV CR (except the attempts to store CR2, which do not need to cause virtualization traps), CLTS, LMSW or SMSW instructions, or a task switch. Virtualization traps may be also caused by a potentially successful attempt of the guest software to set an interrupt flag IF (e.g., via STI, POPF or IRET instructions) if guest software has a pending virtual interrupt. For IA-32 ISA, successful attempts to execute such instructions as, for example, HLT, IN, INS/INSB/INSW/INSD, INVD, OUT, OUTS/OUTSB/OUTSW/OUTSD, RDMSR, and WRMSR, will cause virtualization traps. These virtualization traps will prevent guest software from halting the processor and from directly accessing I/O ports, caches or model-specific registers. In addition, virtualization traps may be caused by attempts to execute CPUID instructions to allow the VMM to present the abstraction of processor features chosen by the VMM, by attempts to execute INVLPG instructions to enable the VMM to properly virtualize address translations, and by attempts to execute IRET instructions (if IRET is used to transition into V32 mode) used by guest software to implement a VMM to allow recursively nested VMMs.

Figure 7:
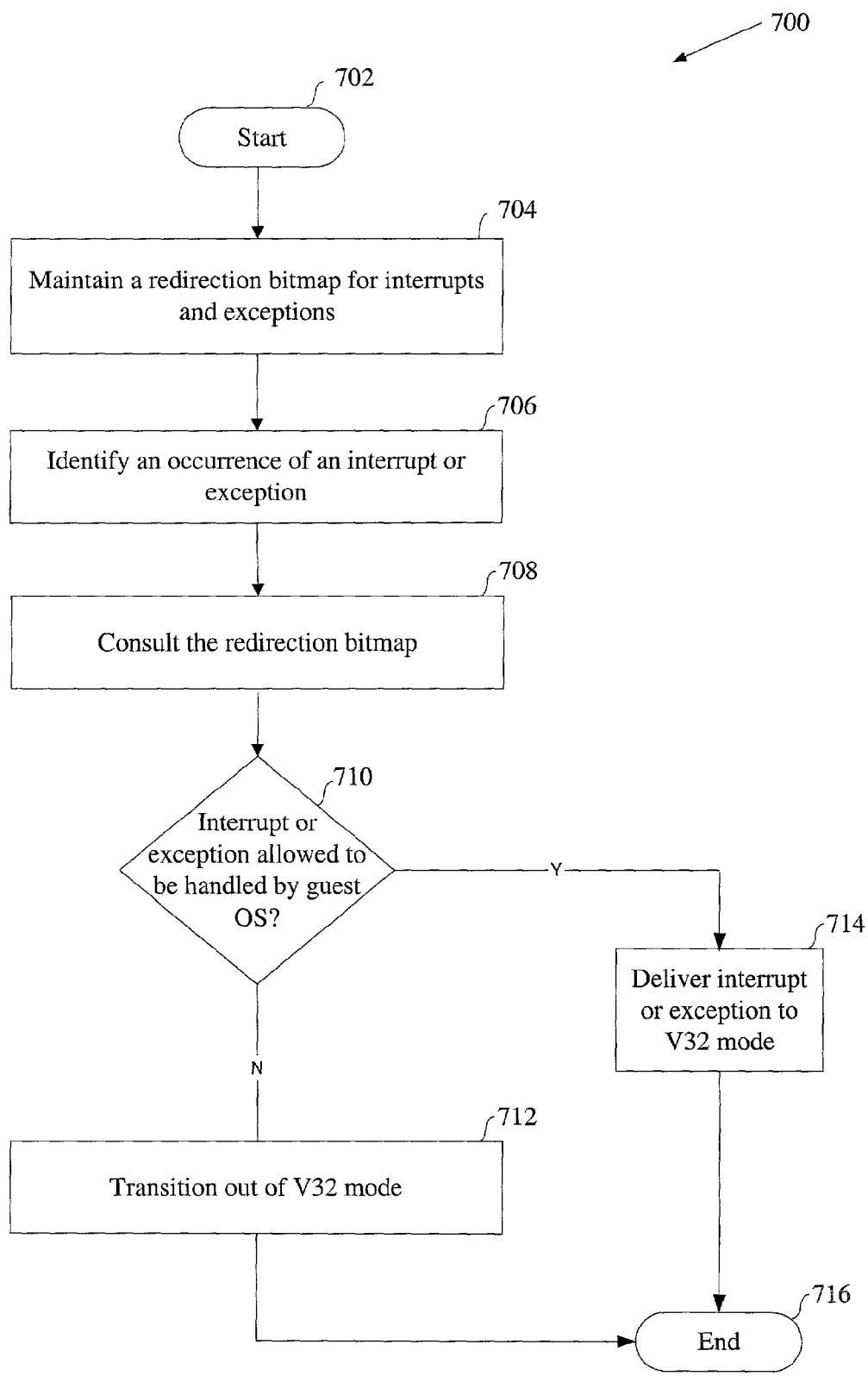
FIG. 7 is a flow diagram of a method for maintaining a redirection map, according to one embodiment of the present invention.

FIG. 7 is a flow diagram of a method 700 for maintaining a redirection map, according to one embodiment of the present invention. According to this embodiment, the VMM maintains a redirection map to configure which interrupts and exceptions should result in a virtualization trap (processing block 704). At processing block 706, an occurrence of an interrupt or exception is identified. The redirection map is then consulted to find a bit associated with this interrupt or exception in the redirection bitmap (processing block 708).

At decision box 710, a determination is made as to whether this interrupt is allowed to be handled by the guest OS. If the determination is positive, the interrupt or exception is delivered to V32 mode and is handled by the guest OS (processing block 714). Alternatively, a virtualization trap is generated, causing a transition out of V32 mode (processing block 712).

Figure 8:
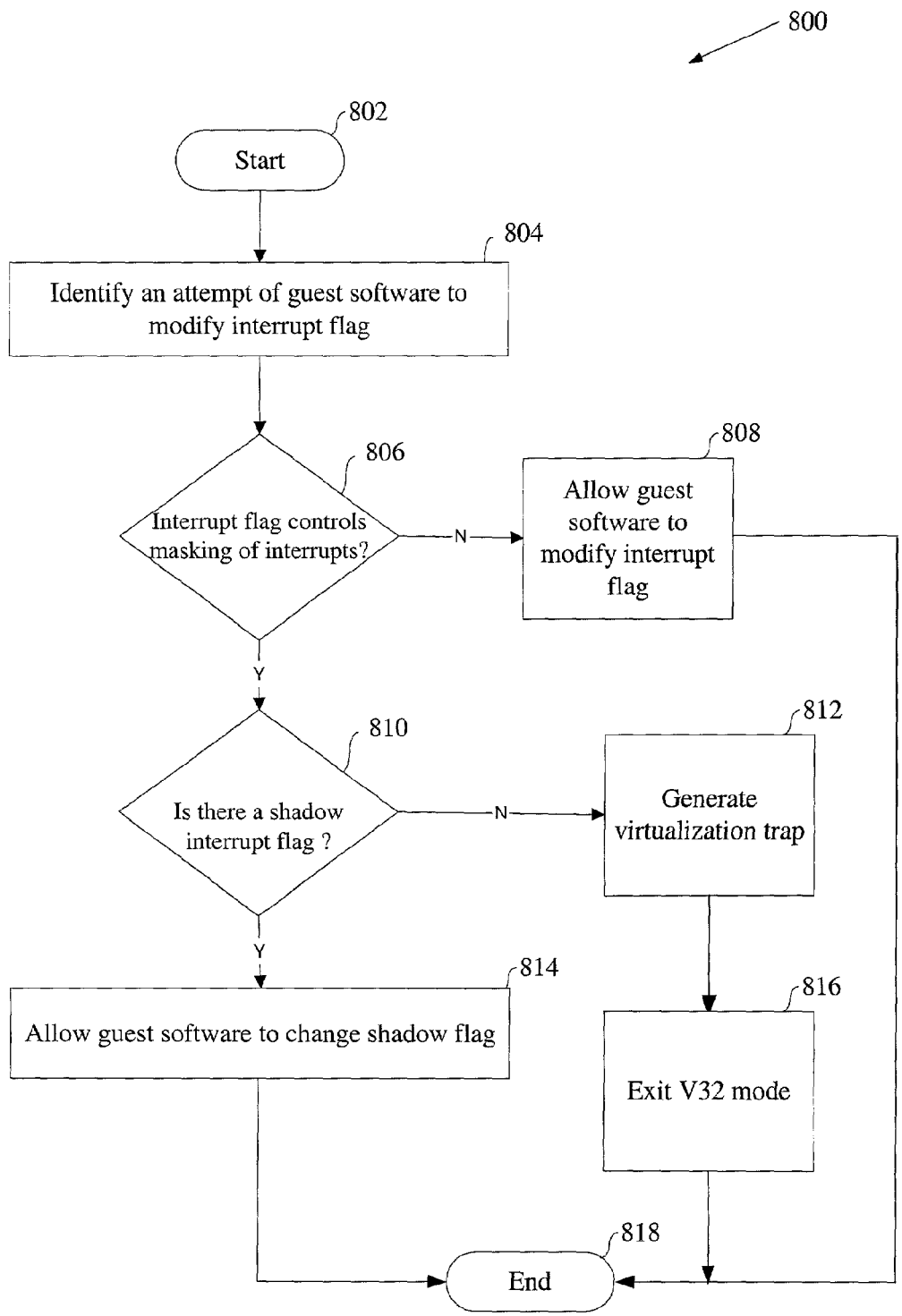
FIG. 8 is a flow diagram of a method for controlling masking of interrupts, according to one embodiment of the present invention.

FIG. 8 is a flow diagram of a method 800 for controlling masking of interrupts, according to one embodiment of the present invention. Various embodiments may be used to control the masking of interrupts. In one embodiment, all interrupts are unmasked when guest software is running. In this embodiment, the guest software is permitted to manipulate an interrupt flag (e.g., for IA-32 microprocessors, this flag is identified as EFLAGS.IF), but this manipulation will be ignored with respect to the masking of interrupts. In another embodiment, the masking of interrupts is dependent on the interrupt flag. In this embodiment, the guest software is not permitted to manipulate the interrupt flag. In particular, the guest software may be prevented from accessing the interrupt flag by providing a shadow interrupt flag (e.g., EFLAGS.VMIF) for modifications by the guest software, by generating a virtualization trap in response to such an attempt of the guest software, or by using any other technique known in the art.

Method 800 begins with identifying an attempt of guest software to modify an interrupt flag that may potentially control masking of interrupts (processing block 804). At decision box 806, a determination is made as to whether the interrupt flag controls the masking of interrupts. If the determination is negative, i.e., all interrupts are unmasked, the guest software is allowed to modify the interrupt flag (processing block 808). As described above, this modification will not have an effect on the masking of the interrupts.

Otherwise, if the masking of interrupts is dependent on the interrupt flag, a determination is then made as to whether a shadow interrupt flag exists, i.e., whether the attempt of the guest software to affect the masking of interrupts is affecting the shadow flag (decision box 810). If the determination is negative, i.e., the guest software attempts to modify the actual interrupt flag, a virtualization trap occurs (processing block 812), causing a transition out of V32 mode (processing block 816). Alternatively, if the actual interrupt flag is not accessible to the guest software, the guest software is allowed to modify the shadow interrupt flag (processing block 814).

Figure 9:
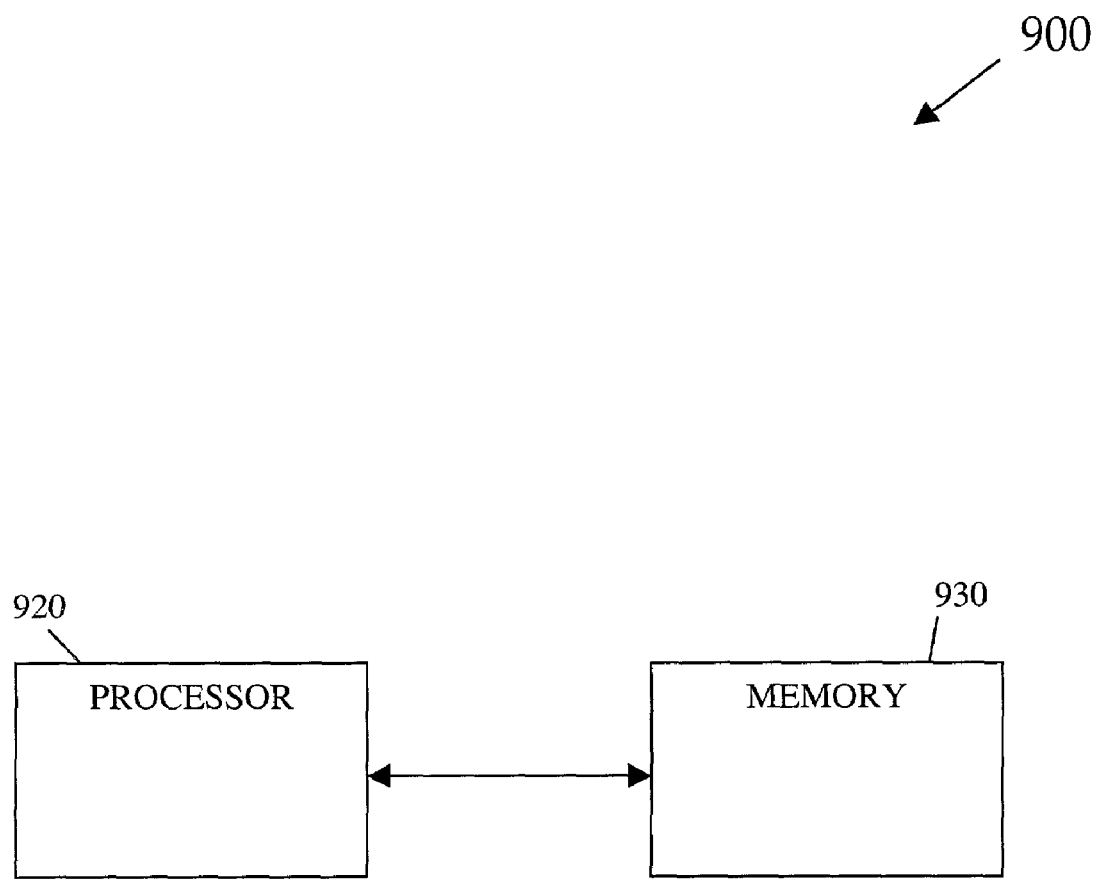
FIG. 9 is a block diagram of one embodiment of a processing system.

FIG. 9 is a block diagram of one embodiment of a processing system. Processing system 900 includes processor 920 and memory 930. Processor 920 can be any type of processor capable of executing software, such as a microprocessor, digital signal processor, microcontroller, or the like. Processing system 900 can be a personal computer (PC), mainframe, handheld device, portable computer, set-top box, or any other system that includes software.

Memory 930 can be a hard disk, a floppy disk, random access memory (RAM), read only memory (ROM), flash memory, or any other type of machine medium readable by processor 920. Memory 930 can store instructions for performing the execution of the various method embodiments of the present invention such as methods 400, 500, 600, 700 and 800 (FIGS. 4-8).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    running guest software in a processor mode that enables the guest software to operate at a privilege level intended by the guest software;
    identifying, within said processor mode, an attempt of the guest software to perform an operation restricted by said processor mode;
    determining, within said processor mode, whether the attempt of the guest software would fail if the guest software was running outside said processor mode;
    allowing the guest software to attempt the operation within said processor mode in response to determining that the attempt would fail if the guest software was running outside said processor mode;
    transferring control over the operation to an operating system running within said processor mode in response to the guest software attempting the operation; and
    generating a virtualization trap in response to determining that the attempt would succeed if the guest software was running outside said processor mode.

2. The method of claim 1 wherein determining that the attempt of the guest software would fail includes determining that the guest software is running with insufficient privilege to perform the operation.

3. The method of claim 1 further comprising exiting said processor mode to transfer control over the operation to a virtual machine monitor running outside said processor mode in response to determining that the attempt would succeed if the guest software was running outside said processor mode.

4. A processor comprising:
    a storage location to store an indicator to indicate whether the processor is configured to execute guest software in a mode that enables the guest software to operate at a privilege level intended by the guest software; and
    logic to execute the guest software in said processor mode, to identify, within said processor mode, an attempt of the guest software to perform an operation restricted by said processor mode, to determine, within said processor mode, whether the attempt would fail if the guest software was running outside said processor mode, to allow the guest software to attempt the operation within said processor mode in response to determining that the attempt would fail if the guest software was running outside said processor mode, to transfer control over the operation to an operating system running within said processor mode in response to the attempt; and to generate a virtualization trap in response to determining that the attempt would succeed if the guest software was running outside said processor mode.

5. The processor of claim 4 wherein the logic is to determine whether the attempt would fail by determining whether the guest software is running with sufficient privilege to perform the operation.

6. The processor of claim 4 wherein the logic is also to exit said processor mode to transfer control over the operation to a virtual machine monitor running outside said processor mode in response to determining that the attempt would succeed if the guest software was running outside said processor mode.

7. A system comprising:
    a memory to store application software and an operating system; and
    a processor to execute the application software in a processor mode that enables the application software to operate at a privilege level intended by the application software, to identify, within said processor mode, an attempt of the application software to perform an operation restricted by said processor mode, to determine, within said processor mode, whether the attempt would fail if the application software was running outside said processor mode, to allow the application software to attempt the operation within said processor mode in response to determining that the attempt would fail if the application software was running outside said processor mode, to transfer control over the operation to the operating system running within said processor mode in response to the attempt; and to generate a virtualization trap in response to determining that the attempt would succeed if the application software was running outside said processor mode.

8. The system of claim 7 wherein the processor is to determine whether the attempt would fail by determining whether the application software is running with sufficient privilege to perform the operation.

9. The system of claim 7 wherein:
    the memory is also to store a virtual machine monitor; and
    the processor is also to exit said processor mode to transfer control over the operation to the virtual machine monitor running outside said processor mode in response to determining that the attempt would succeed.

10. A non-transitory computer readable storage medium that provides instructions, which when executed on a processor, cause the processor to:
    present a virtual machine to guest software in a processor mode that enables the guest software to operate at a privilege level intended by the guest software;
    handle a virtualization trap, where the virtualization trap is generated in response to an attempt of the guest software to perform an operation restricted by said processor mode and a determination, within said processor mode, that the attempt would succeed if the guest software was running outside the virtual machine; and
    allow the guest software to attempt the operation within said processor mode in response to determining that the attempt would fail if the guest software was running outside said processor mode, and
    transfer control over the operation to an operating system running within said processor mode in response to the attempt.

11. The non-transitory computer readable storage medium of claim 10 wherein the determination that the attempt would succeed includes determining whether the application software is running with sufficient privilege to perform the operation.

* * * * *